United States Patent
Claussen et al.

(10) Patent No.: US 7,603,124 B2
(45) Date of Patent: Oct. 13, 2009

(54) AUTOMATICALLY CONFIGURING A NEIGHBOR SET FOR A BASE STATION

(75) Inventors: Holger Claussen, Swindon (GB); Lester Tse Wee Ho, Swindon (GB); Hamid Reza Karimi, Swindon (GB); Louis Gwyn Samuel, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 405 days.

(21) Appl. No.: 11/371,637

(22) Filed: Mar. 9, 2006

(65) Prior Publication Data

US 2007/0213086 A1  Sep. 13, 2007

(51) Int. Cl.
*H04W 36/00* (2006.01)

(52) U.S. Cl. .................. 455/437; 455/436; 455/438; 455/439

(58) Field of Classification Search .......... 455/436–439
See application file for complete search history.

(56) References Cited

U.S. PATENT DOCUMENTS

| | | | |
|---|---|---|---|
| 5,722,073 A * | 2/1998 | Wallstedt et al. ............. 455/437 |
| 6,044,272 A * | 3/2000 | Kobylinski et al. .......... 455/437 |
| 6,119,005 A * | 9/2000 | Smolik ....................... 455/436 |
| 6,201,969 B1 * | 3/2001 | Meier ......................... 455/442 |
| 6,438,379 B1 | 8/2002 | Gitlin et al. |
| 6,922,561 B2 * | 7/2005 | Chen et al. ................ 455/435.1 |
| 2005/0130672 A1 * | 6/2005 | Dean et al. ............... 455/456.1 |

FOREIGN PATENT DOCUMENTS

WO  WO 02/27966  * 4/2002

* cited by examiner

*Primary Examiner*—Vincent P Harper
*Assistant Examiner*—Marisol Figueroa

(57) ABSTRACT

An automated technique for configuring a neighbor set for a base station (32) includes initializing the neighbor set based upon reported measurements from a mobile station (22). In a disclosed example, a newly installed base station (32) transmits a cell information list to a mobile station (22) requesting measurement reports regarding a plurality of candidate base station identifiers. Based upon the reported measurements, a determination is made regarding which of the base stations should be included in the neighbor set for the base station (32). A disclosed example includes the capability of automatically initializing the neighbor set and automatically updating the set. Disclosed examples include utilizing information from a plurality of mobile stations.

12 Claims, 1 Drawing Sheet

AUTOMATICALLY CONFIGURING A NEIGHBOR SET FOR A BASE STATION

FIELD OF THE INVENTION

This invention generally relates to communication. More particularly, this invention relates to wireless communications.

DESCRIPTION OF THE RELATED ART

Wireless communications are in widespread use. Cellular communication systems are typically arranged so that a plurality of base stations are strategically positioned to provide wireless communication service over corresponding geographic areas. The area served by a base station is typically referred to as a cell. For various reasons it is necessary for a base station to have information regarding nearby base stations. A listing of such base stations is typically referred to as a neighbor set or a neighbor list. There are known techniques for using information from a neighbor set for facilitating handoffs as a mobile station travels between cells, for example.

Recently, there has been an increasing demand for higher data rates and enhanced wireless communication services. One attempt at addressing these demands is to utilize smaller cell sizes and to increase the number of cells. Adding additional cells requires adding additional base stations. In addition to the cost associated with new base station hardware and installation, there is an additional burden on wireless service providers to configure each base station. For example, each base station must be configured to include an appropriate neighbor set or neighbor list.

The typical process for providing a neighbor set for a base station includes manually performing field measurements and utilizing off-line planning tools, for example. The manual approach is expensive, time consuming and therefore disadvantageous. The manual approach in many cases requires individual time to test drive an area to obtain measurements regarding the network environment.

Additionally, the traditional approach does not accommodate changes in a network. For example, if new base stations are deployed, each existing base station could require changes made to the neighbor list. This process requires restarting measurement and optimization using the manual approach.

Another shortcoming with the typical approach is that measurements performed by drive testing personnel do not reveal signal conditions in areas that are difficult to access during such a test. The approach, therefore, only reveals certain aspects of the signal conditions surrounding a base station. Actual wireless communication users may experience different signal conditions and a better-configured neighbor list would be beneficial for facilitating communications on behalf of subscribers.

There is a need for an improved technique for configuring a neighbor set or neighbor list for a base station. This invention addresses that need while avoiding the shortcomings and drawbacks mentioned above.

SUMMARY OF THE INVENTION

An exemplary method includes automatically configuring a neighbor set for a base station responsive to measurements from a mobile station regarding candidate neighbor base stations.

In one example, instructions are provided to the mobile station to report at least a power measurement regarding each of a plurality of candidate base stations. The reports from the mobile station are used for determining which power measurements correspond to neighbor base stations. Appropriate base stations are then included in the automatically configured neighbor set.

One example includes providing base station identifiers to the mobile station for which information is required for automatically configuring the neighbor set. In one example, subsets of all possible candidates are sequentially provided to the mobile station until all desired information has been gathered for purposes of automatically configuring the neighbor set.

One example includes initializing a neighbor set based upon measurements from at least one mobile station. One example includes updating the neighbor set based upon measurements from a plurality of mobile stations.

The various features and advantages of this invention will become apparent to those skilled in the art from the following detailed description. The drawings that accompany the detailed description can be briefly described as follows.

DETAILED DESCRIPTION

This invention provides an automated technique for configuring a neighbor set for a base station. A disclosed example demonstrates how information from a mobile station can be used to initialize or update a neighbor set for a base station.

Figure 1:
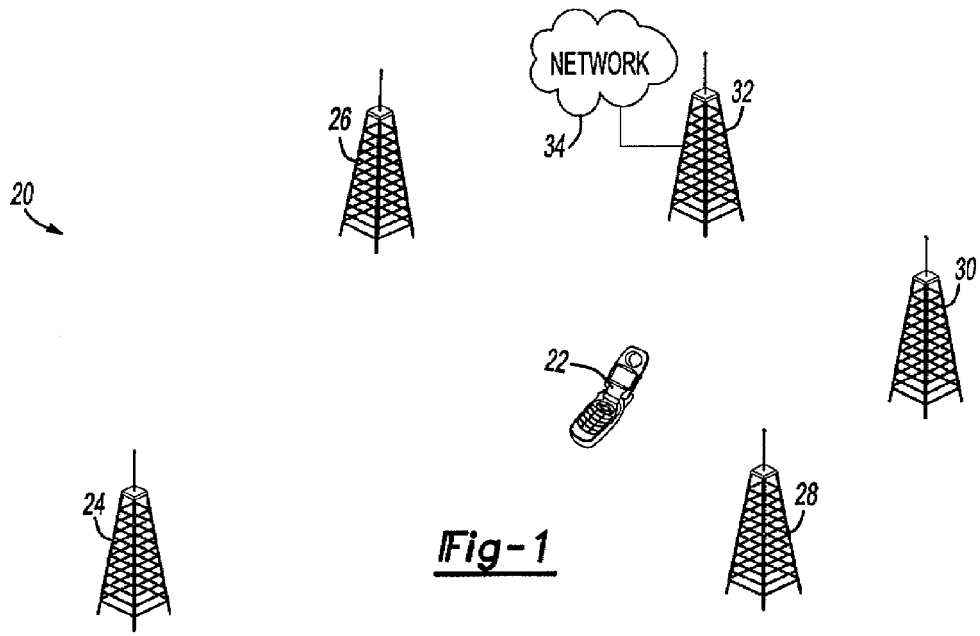
FIG. 1 schematically illustrates selected portions of a wireless communication system useful with an embodiment of this invention.

FIG. 1 schematically shows selected portions of a wireless communication system 20. In this example, the wireless communication system facilitates communications on behalf of a mobile station 22 using known techniques. The illustrated example includes a plurality of base stations 24, 26, 28 and 30. Another base station 32 is, for discussion purposes, a recently or newly installed base station for which a neighbor set must be provided. Each of the base stations 24-32 communicates with a network 34 such as a radio access network (RAN) using known techniques. An example communication link is schematically shown between the network 34 and the base station 32 for illustration purposes. Those skilled in the art will realize how the various base stations are configured for communicating with the network 34 using known techniques.

At some point associated with the installation process for the base station 32, a base station identifier is provided for the base station 32. In one example, the base station identifier comprises a scrambling code as known in UMTS communication systems. In another example, the base station identifier comprises a pseudo random noise offset (PN offset) as used in CDMA communication systems, for example. Other communication systems or protocols may require other types of base station identifier information. Those skilled in the art who have the benefit of this description will realize how base station identifier information that will meet their particular needs can be applied to an embodiment of this invention. For illustration purposes, a scrambling code as used in a UMTS system will be discussed as an example base station identifier.

Figure 2:
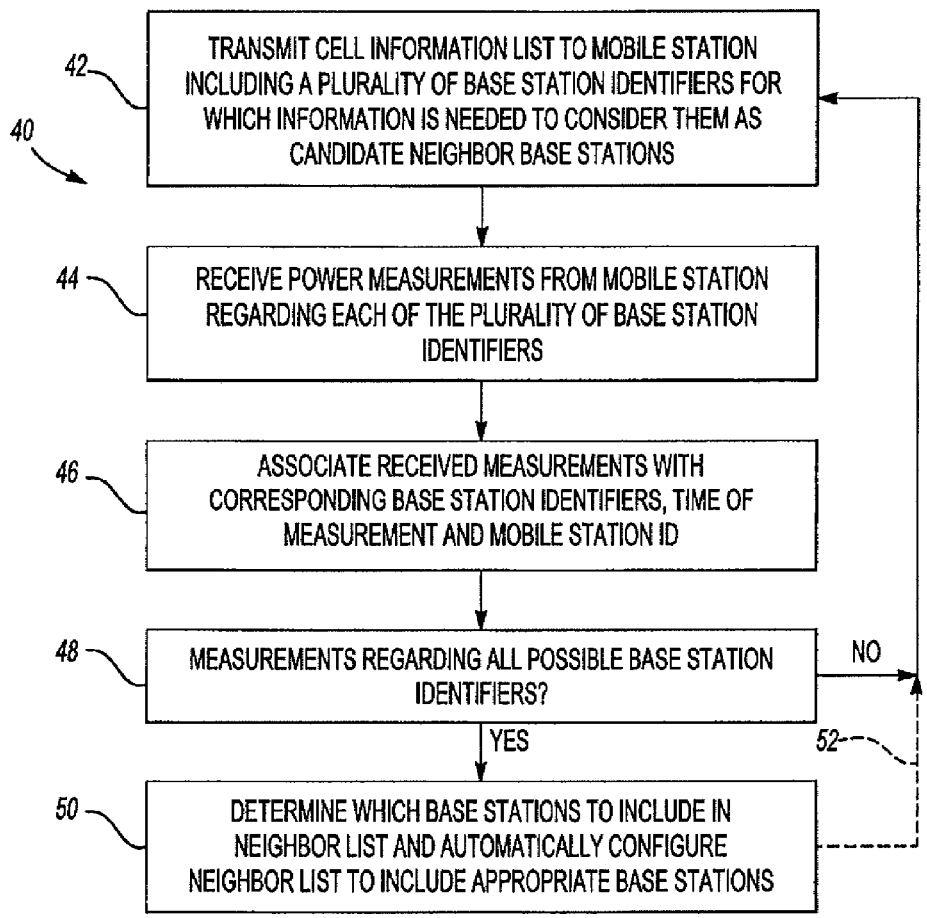
FIG. 2 is a flowchart diagram summarizing one example approach according to an embodiment of this invention.

An example process of establishing a neighbor set for the base station 32 is summarized in the flowchart diagram 40 of FIG. 2. At some point after installation, the base station 32 begins communicating with the mobile station 22. At 42, the base station 32 transmits a cell information list (CIL) to the mobile station 22. The initial CIL from the base station 32 will contain an indication of the base station identifier associated with the base station 32. There will be no other entries regarding an active set or an empty measured set within the CIL because, as yet, no information on the network neighborhood has become available to the base station 32. To facilitate a reliable connection with the mobile station 22, more information, such as possible handover candidate cells is required.

In one example, the CIL includes 32 entries. The initial CIL transmitted by the base station 32 includes the base station identifier for the base station 32 and 31 free entries. In one example, the 31 free entries are utilized to instruct the mobile station 22 regarding a plurality of base station identifiers for which information is needed to consider them as candidate neighbor base stations. When scrambling codes are used as base station identifiers, the 31 free entries each include a scrambling code that the mobile station 22 will use for gathering information regarding the corresponding base stations.

In one example, a subset of 31 out of the 511 possible scrambling codes (e.g., there are 512 codes currently available with one already being used by the base station 32) in the CIL. The base station 32 then waits for measurement reports for each of those base station identifiers. The measurement report in one example comprises at least a power measurement obtained by the mobile station 22 for each of the base station identifiers. Obtaining such a power measurement is accomplished using known techniques.

Once received at 44, an environment measurement list can be established to include information regarding the received measurements. In the example of FIG. 2, the received measurements are associated with corresponding base stations identifiers, a time of the measurement and information regarding the mobile station from which the measurements were received. This association is schematically shown at 46 in FIG. 2.

At 48, a determination is made whether measurements regarding all possible base station identifiers have been obtained. If not, another CIL is transmitted to the mobile station 22 including the next plurality of base station identifiers from the possible candidate list. In the case of using UMTS scrambling codes, the CIL will be transmitted to the mobile station 22 with different scrambling codes for measurement until all 511 possible codes have been scanned by the mobile station 22 or communication with the mobile station 22 has ceased.

The environment measurement list (e.g., information gathered from at least one and in most cases several mobile stations) in one example is stored in a centralized database in the network 34. In another example, the information is stored in a distributed database that is maintained by each base station, for example. Given this description, those skilled in the art will be able to appropriately configure a database for maintaining such information.

Based upon the received measurements, a determination is made regarding which of the base stations should be included in the neighbor set or neighbor list for the base station 32. Referring to the example of FIG. 1, the mobile station 22 will most likely obtain better power measurements from the base stations 26, 28 and 30 than it will from the base station 24. This will be due, in most circumstances, to the closer proximity between the mobile station 22 and the base stations 26, 28 and 30 compared to the distance between the mobile station 22 and the base station 24. The quality of the power measurement is one example criteria to use for determining which of the base stations should be included in the neighbor list for the base station 32. Given this description, those skilled in the art will be able to develop appropriate decision criteria for determining which base stations to include in the neighbor list and to decide whether to execute an appropriate decision algorithm using a portion of the network 34 or at each base station.

As shown at 50 in FIG. 2, the neighbor list can then be automatically configured to include appropriate base stations based upon the measurements received from the mobile station 22.

The example of FIG. 2 includes the possibility for periodically updating the neighbor list and for obtaining additional information for the neighbor list from a plurality of mobile stations. By utilizing information from all mobile stations connected to a base station, more reliable information can be gathered regarding surrounding cells for each base station. Moreover, periodically, automatically updating the neighbor list accommodates the situation where additional base station equipment is introduced for establishing additional cells within a region.

In an example where a base station already has an established neighbor list, the CIL may be used to facilitate updating that neighbor list or reconfiguring it if appropriate. One example includes allocating five entries in the CIL to the active set of the base station. Twenty entries of the CIL are considered in the monitored set for measuring known neighbor list members that are handover candidates. The remaining seven entries in the CIL are considered a monitored set for scanning changes in the network neighborhood. In other words, seven entries in the CIL may be used for instructing the mobile station to obtain measurement information regarding seven base station identifiers. The plurality of base station identifiers included in those seven entries may be cycled through an entire set of identifiers of interest in a manner similar to that described above (where 31 free entries were used).

In one example, because the time information of collected measurements and mobile station identification information are associated with the measurements, it is possible to ensure that the neighbor list is kept current and to possibly exclude data from mobile stations that are not providing reliable reported information. For example, the information regarding one mobile station may be automatically compared with information from one or more other mobile stations. If there is no compatibility between the measurements of the mobile stations, a malfunctioning mobile station may be identified. A mobile station identifier may then be flagged so that further measurements from that mobile station are not used for purposes of configuring the neighbor set, for example. This approach adds additional robustness and provides an ability to avoid malicious attacks through incorrect measurements regarding configuration of a network, for example.

In some situations, there will be information available to a base station supplier regarding a surrounding network that is useful for initially configuring a neighbor set. For example, it may be known which base station identifiers are associated with the base stations that are the most likely candidate members of the neighbor set for a new base station. Such information may be utilized for configuring the CIL transmitted to the mobile station 22 for initializing the neighbor set. For example, a preselection of appropriate base station identifiers may be included within the first 31 free entries provided to the mobile station for requesting measurements. This can facilitate faster convergence toward an initial configuration of the neighbor set.

In another example, the detected set of a mobile station 22 is used for purposes of establishing which base station identifiers will be considered in the automatic neighbor list configuration process. One aspect of this approach is that it leaves the mobile station essentially in control of the threshold for detection. The detected set contains information on intra-frequency cells which the mobile station detects and are not included in either the mobile stations active set or the measured set.

One example includes using the information gathered from the mobile station not only for establishing a neighbor list but for more efficiently using base station identifiers such as scrambling codes or pseudorandom noise offsets. In one example, the new base station 32 is initialized with a base station identifier selected by a provider of the base station equipment. After the environment measurement list is developed based upon measurements reported by at least one mobile station, it becomes possible to determine which base station identifiers are not being used within the general proximity of the base station 32. One of those base station identifiers may be selected as a new base station identifier for the base station 32 because it has an increased likelihood of optimizing performance. For example, selecting a scrambling code associated with the lowest received signal power reported by the mobile station 22 provides some assurance that the scrambling code is not being used within the geographic vicinity of the base station 32. This avoids any conflict between scrambling codes of base stations that are potentially close enough to be detected by the same mobile station, simultaneously, for example.

The disclosed examples replace the traditional, manual approach including drive testing, taking measurements and using centralized planning for establishing a neighbor list for base stations. The automated configuration technique utilizing reports from mobile stations not only facilitates automatically initializing a neighbor set but facilitates automatically updating it to provide more accurate information and to automatically respond to changes in the wireless communication environment surrounding a base station. The disclosed example reduces expenses associated with deployment configuration and operation of wireless communication networks. A significant advantage is that no a priori information or control on where a base station is placed is required. Additionally, more relevant data for configuration is obtained with the disclosed example. Significantly, no modification to mobile stations is required and minimal modification, if any, is required for network components.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method, comprising:
   automatically configuring a neighbor set for a base station responsive to measurements from each of a plurality of mobile stations regarding candidate neighbor base stations;
   attempting to confirm the measurements from at least a first one of the mobile stations using the measurements of a second one of the mobile stations; and
   determining that the first one of the mobile stations should not be used for automatically configuring the neighbor set if the measurements of the second one of the mobile stations does not confirm the measurements of the first one of the mobile stations.

2. The method of claim 1, comprising
   instructing the mobile station to report at least a power measurement regarding each of a plurality of candidate base stations;
   determining which of the reported power measurements correspond to neighbor base stations; and
   including the corresponding neighbor base stations in the automatically configured neighbor set.

3. The method of claim 2, comprising
   instructing the mobile station to report at least the power measurement regarding each of a plurality of base station identifiers selected from available base station identifiers;
   associating the reported power measurement with respective base station identifiers, a time corresponding to the power measurement, an identifier of the mobile station reporting the power measurement; and
   at least temporarily storing the associated power measurement, time and identifier of the mobile station.

4. The method of claim 3, comprising
   instructing the mobile station to report at least the power measurement regarding each of a plurality of base station identifiers selected as a subset of the available base station identifiers;
   repeating the instructing regarding another subset until at least the power measurement has been received from the mobile station for all available base station identifiers or the mobile station ceases communicating with the base station; and
   performing the associating and storing steps for each of the base station identifiers.

5. The method of claim 4, comprising
   determining at least which of the stored power measurements indicates a base station that should be included in the neighbor set.

6. The method of claim 5, comprising
   selecting a base station identifier for the base station that is different from the base station identifiers of the base stations in the neighbor set.

7. The method of claim 3, wherein the base station identifier comprises at least one of a scrambling code or a pseudo random noise offset.

8. The method of claim 1, comprising
   initializing the neighbor set automatically responsive to the measurements from the mobile station; and
   updating the initialized neighbor set automatically responsive to at least one of subsequent measurements from the mobile station or measurements from another mobile station.

9. The method of claim 8, wherein the initializing comprises
   transmitting a cell information list to the mobile station, the cell information list including one entry corresponding to the base station and a plurality of entries corresponding to candidate neighbor stations such that the mobile station utilizes the plurality of entries for determining from which candidate neighbor stations to obtain at least a power measurement for reporting to the base station.

10. The method of claim 9, comprising
    repeating the transmitting wit a new list in the plurality of entries until a mobile station report regarding all candidate neighbor stations has been received or the mobile station stops communicating with the base station.

11. The method of claim 8, wherein the updating comprises transmitting a cell information list to the mobile station, the cell information list having a preset number of entries including one entry corresponding to the base station, a first plurality of entries corresponding to base stations in an active set of the mobile station, a second plurality of entries corresponding to base stations from the automatically initialized neighbor set for monitoring as handover candidates and a third plurality of remaining entries of the cell information list corresponding to candidate neighbor base stations for instructing the mobile station to report at least a power measurement from the corresponding candidate neighbor base stations.

12. The method of claim 1, comprising
identifying each of the candidate neighbor base stations using at least one of a scrambling code or a pseudo random noise offset.

* * * * *

UNITED STATES PATENT AND TRADEMARK OFFICE
CERTIFICATE OF CORRECTION

PATENT NO.        : 7,603,124 B2                                    Page 1 of 1
APPLICATION NO. : 11/371637
DATED             : October 13, 2009
INVENTOR(S)       : Claussen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Fifth Day of October, 2010

David J. Kappos
*Director of the United States Patent and Trademark Office*